United States Patent
Quan

(10) Patent No.: US 9,932,870 B2
(45) Date of Patent: Apr. 3, 2018

(54) EXHAUST GAS AFTERTREATMENT DEVICE FOR A COMBUSTION ENGINE, IN PARTICULAR OF A MOTOR VEHICLE

(71) Applicant: Daimler AG, Stuttgart (DE)

(72) Inventor: Peng Quan, Novi, MI (US)

(73) Assignee: Daimler AG, Stuttgart (DE)

( * ) Notice: Subject to any disclaimer, the term of this patent is extended or adjusted under 35 U.S.C. 154(b) by 24 days.

(21) Appl. No.: 14/875,970

(22) Filed: Oct. 6, 2015

(65) Prior Publication Data
US 2016/0194993 A1   Jul. 7, 2016

(30) Foreign Application Priority Data

Oct. 7, 2014   (GB) .................................. 1417685.3

(51) Int. Cl.
| | | |
|---|---|---|
| F01N 3/20 | (2006.01) | |
| F01N 3/28 | (2006.01) | |
| F01N 13/08 | (2010.01) | |
| F01N 13/18 | (2010.01) | |

(52) U.S. Cl.
CPC ......... *F01N 3/2066* (2013.01); *F01N 3/2892* (2013.01); *F01N 13/08* (2013.01); *F01N 13/1872* (2013.01); *F01N 13/1888* (2013.01); *F01N 2240/20* (2013.01); *F01N 2610/02* (2013.01); *F01N 2610/1453* (2013.01); *Y02T 10/24* (2013.01)

(58) Field of Classification Search
CPC .. F01N 13/08; F01N 13/1872; F01N 13/1888; F01N 3/2066; F01N 3/2892; F01N 2240/20; F01N 2610/02; F01N 2610/1453; Y02T 10/24
See application file for complete search history.

(56) References Cited

U.S. PATENT DOCUMENTS

| | | | |
|---|---|---|---|
| 8,397,492 B2* | 3/2013 | Kowada .............. | B01F 3/04049 60/295 |
| 2010/0212292 A1 | 8/2010 | Rusch et al. | |
| 2012/0144812 A1 | 6/2012 | Hyun | |

FOREIGN PATENT DOCUMENTS

| | | |
|---|---|---|
| DE | 10 2011 051 878 A1 | 6/2012 |
| EP | 2 282 026 A1 | 2/2011 |
| EP | 2 423 479 A2 | 2/2012 |

(Continued)

OTHER PUBLICATIONS

Great Britain Search Report issued in counterpart Application No. GB1417685.3 dated Mar. 9, 2015 (Three (3) pages).

*Primary Examiner* — Brandon Lee
(74) *Attorney, Agent, or Firm* — Crowell & Moring LLP

(57) ABSTRACT

An exhaust gas aftertreatment device for a combustion engine is disclosed. The device includes an exhaust pipe element having an exhaust duct through which exhaust gas of the combustion engine is flowable and a dosage device which opens into the exhaust duct at a feed point, where the dosage device is configured to introduce a reduction agent into the exhaust pipe element at the feed point. A baffle is arranged in the exhaust duct which divides the exhaust duct at least partially into a first passage and a second passage where the first and second passages have a respective inlet opening and are fluidically arranged in parallel. The feed point is disposed in the first passage and is shielded from the second passage by the baffle where the inlet opening of the second passage is disposed upstream of the feed point.

3 Claims, 4 Drawing Sheets

(56) References Cited

FOREIGN PATENT DOCUMENTS

JP 48 28819 4/1973
WO WO 2013/010700 A1 1/2013

\* cited by examiner

EXHAUST GAS AFTERTREATMENT DEVICE FOR A COMBUSTION ENGINE, IN PARTICULAR OF A MOTOR VEHICLE

This application claims the priority of Great Britain Patent Application No. GB 1417685.3, filed Oct. 7, 2014, the disclosure of which is expressly incorporated by reference herein.

BACKGROUND AND SUMMARY OF THE INVENTION

The invention relates to an exhaust gas aftertreatment device for a combustion engine, in particular of a motor vehicle.

Such an exhaust gas aftertreatment device for a combustion engine, in particular of a motor vehicle, can be found in U.S. 2010/0212292 A1. The exhaust gas aftertreatment device includes at least one exhaust pipe element having an exhaust duct through which exhaust gas of the combustion engine can flow. Moreover, the exhaust gas aftertreatment device includes a dosage device which opens into the exhaust duct at a feed point. The dosage device is configured to introduce a reduction agent which is also referred to as a reducing agent into the exhaust pipe element at the feed point. For example, the reduction agent is urea which is present in an aqueous urea solution. Usually, the reduction agent is stored in a tank of the motor vehicle and carried along in the tank.

The exhaust gas and the reduction agent contained in the exhaust gas flow to an SCR catalytic converter (SCR—Selective Catalytic Reduction) by means of which a reaction of the exhaust gas and in particular of nitrogen oxides (NOx) contained in the exhaust gas with ammoniac (NH3) contained in the reduction agent is caused. In the course of this reaction the ammoniac reacts with the nitrogen oxides to produce water and nitrogen. Thus, the reduction agent is used for the so-called denitriding of the exhaust gas.

Furthermore, DE 10 2011 051 875 A1 shows a dosing module for an exhaust gas aftertreatment system of a vehicle, the dosing module being used to inject a reducing agent along a flow of exhaust gas at a front side of an SCR catalytic converter.

It has been shown that a significant urea deposit, in particular on the exhaust pipe element, can occur, wherein the urea deposit cannot be used for the selective catalytic reduction.

Therefore, it is an object of the present invention to provide an exhaust gas aftertreatment device of the aforementioned kind, in which the urea deposit can be kept particularly low.

In order to provide an exhaust gas aftertreatment device in which an exhaust gas aftertreatment device urea deposit can be avoided or can be kept particularly low, according to the present invention the exhaust gas aftertreatment device includes a baffle which is arranged in the exhaust duct. By means of the baffle the exhaust duct is at least partially divided into two passages which have an inlet opening for the exhaust gas respectively so that the exhaust gas can flow through the passages. The passages are fluidically arranged in parallel. This means the passages are not arranged in sequence so that the exhaust gas does not need to flow through one of the passages at first and then through the other passage, but the exhaust gas can flow simultaneously or fluidically parallel through both passages. Thus, a main flow of the exhaust gas is divided into two partial flows by means of the baffle, where one of the partial flows flows through one of the passages and the other partial flow flows through the other passage, in particular in a parallel manner.

The feed point of the reduction agent for the exhaust gas aftertreatment device according to the present invention is arranged in one of the passages and shielded from the other passage by the baffle, where at least the inlet opening of the other passage is arranged upstream of the feed point. Thus, the one passage is a mixing passage in which the reduction agent is mixed with the exhaust gas flowing through one passage. Hence, the reduction agent, in particular urea, can deposit on the baffle, in particular on an inner surface of the baffle, bounding the one passage at least partially. However, the other passage can be used as a heating passage which starts from a location before the feed point and a mixing zone in which the reduction agent is mixed with exhaust gas since the inlet opening of the other passage is arranged upstream of the feed point. Thereby, it can be ensured that the exhaust gas flowing through the other passage (heating passage) is always free of reduction agent and, thus, deposit, thereby effectively heating the deposit and deposit sites on the baffle all the time. Thereby, deposit on the baffle can be resolved and/or kept particularly low. Thus, the consumption of the reduction agent during the operation of the combustion engine can be kept particularly low. Moreover, repair cost resulting from urea deposit can be reduced or avoided.

The baffle can be implemented in existing exhaust gas aftertreatment devices with little changes at the most so that the costs for retrofitting existing exhaust gas aftertreatment devices can be kept low. Since the deposit of the reduction agent can be avoided or kept particularly low, a less frequent regeneration is needed which results in a reduced fuel consumption of the combustion engine.

In a particularly advantageous embodiment of the invention, the baffle is configured as an entirely closed dividing wall. This means the baffle does not have any through openings through which exhaust gas or reduction agent can flow. Thereby, the other passage can be shielded from reduction agent particular effectively so that reduction agent deposit can be kept particularly low, especially on the inner surface of the baffle since the baffle can be heated by the exhaust gas flowing through the passage very efficiently.

It has turned out to be particularly advantageous if the baffle has at least one curved portion for diverting or deflecting the exhaust gas. Thereby, a particularly advantageous flow of the exhaust gas can be realized so that reduction agent deposit can be kept particularly low. Moreover, by diverting or deflecting the exhaust gas, the back pressure caused by the exhaust gas aftertreatment device can be kept very low.

In a further particularly advantageous embodiment of the invention, the baffle has at least one straight portion extending parallel to the direction of flow of the exhaust gas, the straight portion being arranged upstream of the curved portion. By means of the straight portion, the exhaust gas can be guided advantageously to the curved portion which diverts or deflects the exhaust gas after the straight portion. Hence, a particularly efficient operation of the exhaust gas aftertreatment device can be realized.

For realizing a particularly advantageous flow of the exhaust gas, the baffle has at least one end portion which is bent to one of the passages, in particular towards the one passage, with respect to at least one other portion of the baffle. Thereby, for example, the main flow of the exhaust gas can be split into the partial flows in a need-based manner so that reduction agent deposit can be kept particularly low.

In order to keep the backpressure caused by the exhaust gas aftertreatment device particularly low, the baffle can be streamlined.

The invention further relates to a motor vehicle including a combustion engine and at least one exhaust gas aftertreatment device according to the present invention. Advantageous embodiments of the exhaust gas aftertreatment device according to the present invention are to be regarded as advantageous embodiments of the motor vehicle according to the present invention and vice versa.

Further advantages, features, and details of the invention derive from the following description of preferred embodiments as well as from the drawings. The features and feature combinations previously mentioned in the description as well as the features and feature combinations mentioned in the following description of the figures and/or shown in the figures alone can be employed not only in the respective indicated combination but also in any other combination or taken alone without leaving the scope of the invention.

DETAILED DESCRIPTION OF THE DRAWINGS

In the Figures the same elements or elements having the same functions are designated with the same reference signs.

Figure 1:
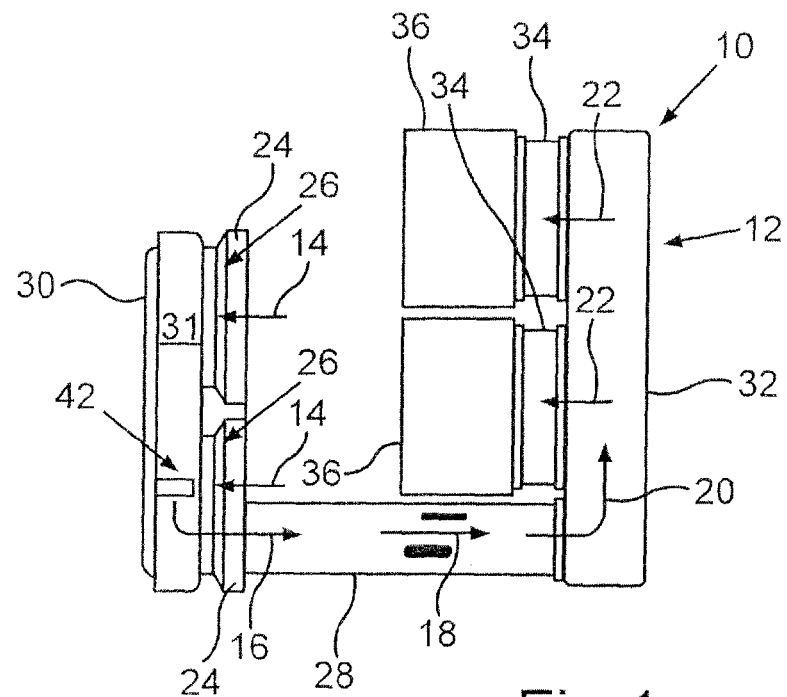
FIG. 1 is a schematic top view of an exhaust gas aftertreatment device for a combustion engine of a motor vehicle, the exhaust gas aftertreatment device including a baffle arranged in an exhaust duct and dividing the exhaust duct at least partially into two passages having an inlet opening for exhaust gas respectively and being fluidically arranged in parallel, where a feed point is arranged in one of the passages and shielded from the other passage by the baffle, and where at least the inlet opening of the other passage is arranged upstream of the feed point.

FIG. 1 shows a schematic top view of an exhaust gas aftertreatment device 10 for a combustion engine of a motor vehicle in the form of a utility motor vehicle, the combustion engine being configured as an internal combustion engine. The exhaust gas aftertreatment device 10 includes an exhaust pipe element in the form of an exhaust gas aftertreatment box 12 which is a guide element for guiding exhaust gas of the combustion engine. The exhaust gas aftertreatment box 12 is an at least substantially box-like container for guiding the exhaust gas which can flow through the exhaust gas aftertreatment box 12 (exhaust pipe element).

The exhaust gas aftertreatment box 12 is arranged in an exhaust tract of the combustion engine and fluidically connected to an exhaust gas pipe through which the exhaust gas can flow. By means of the exhaust gas pipe the exhaust gas leaving combustion chambers in the form of cylinders of the combustion engines is fed into the exhaust gas aftertreatment box 12 so that the exhaust gas can flow from the exhaust gas pipe into the exhaust gas aftertreatment box 12 and can flow through it—as indicated in FIG. 1 by directional arrows 14, 16, 18, 20 and 22.

The exhaust gas aftertreatment box 12 includes first guide portions 24 bounding respective exhaust gas guide ducts 26. The exhaust gas guide ducts 26 are at least in portions fluidically separate from each other, and the exhaust gas can flow through the exhaust gas guide ducts 26 in a first flow direction which is indicated by the directional arrows 14. In other words, the exhaust gas flows through the exhaust gas guide ducts 26 in a first flow direction during a fired operation of the combustion engine.

The first guide portions 24 form respective connection elements by means of which each first guide portion 24 is fluidically connectable to a particle filter. The particle filters are not shown in FIG. 1 and are arranged in parallel to each other with regard to the flow of the exhaust gas through the particle filters and the first guide portions 24. Accordingly, the guide elements 24 are fluidically arranged in parallel to each other.

For example, the combustion engine is a diesel engine which can be operated on liquid fuel in the form of diesel. The particle filters which are accordingly also referred to as diesel particle filters (DPF) in this connection serve for filtering particles contained in the exhaust gas from the exhaust gas. The exhaust gas aftertreatment box 12 also includes a second guide portion 28 which is also referred to as a hydraulic pipe or a hydrolysis tube through which the exhaust gas of the combustion engine can flow in a second flow direction which is illustrated by the directional arrow 18. The second flow direction is opposite to the first flow direction. In other words, the exhaust gas during a fired operation of the combustion engine flows through the first guide portions 24 in the first flow direction and through the second guide portion 28 in the second flow direction which is contrary to the first flow direction.

Moreover, the exhaust gas aftertreatment box 12 includes a third guide portion in the form of a first collection chamber 30. The first collection chamber 30 is fluidically connected both to the first guide portions 24 as well as the second guide portion 28 so that the guide portions 24, 28 are fluidically connected to each other via the first collection chamber 30. In this setup the exhaust gas flowing from the first guide portions 24 into the collection chamber 30 is collected in the collection chamber 30 and by means of the collection chamber 30—as it is illustrated by the directional arrow 16 in FIG. 1—is redirected from the first flow direction indicated by the directional arrows 14 into the second flow direction indicated by the directional arrow 18. Thereby, a particularly small construction space required by the exhaust gas aftertreatment device 10 can be realized.

Figure 2:
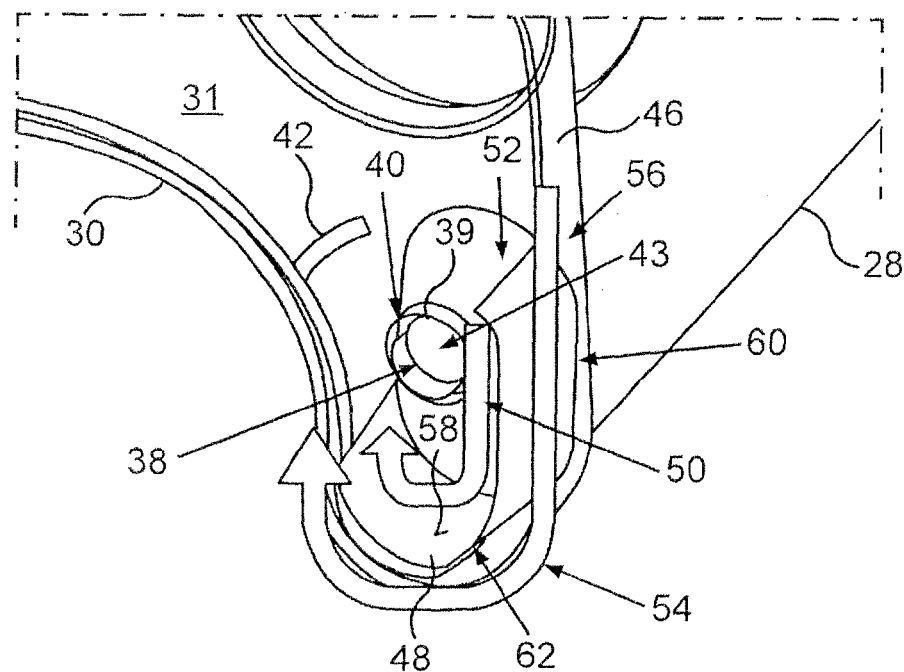
FIG. 2 is part of a schematic and perspective view of the exhaust gas aftertreatment device according to FIG. 1.

As can be seen from FIG. 2, the first collection chamber 30 which is also referred to as a DPF out chamber has an exhaust duct 31 through which the exhaust gas flowing from the first guide portions 24 to the second guide portion 28 can flow. The second guide portion 28 is fluidically connected with the first collection chamber 30 on one side. On the other side, the second guide portion 28 is fluidically connected with a fourth guide portion in the form of a second collection chamber 32 of the exhaust gas aftertreatment box 12 so that the exhaust gas flowing through the second guide portion 28 flows from the latter into the second collection chamber 32. Moreover, the exhaust gas aftertreatment box 12 includes two fifth guide portions 34 which are fluidically connected to the second collection chamber 32. The fifth guide portions 34 bound respective exhaust gas guide ducts through which the exhaust gas can flow. In other words, the exhaust gas which flows into the second collection chamber 32 and is collected by the same flows from the second collection chamber 32 into the exhaust guide ducts and thus into the fifth guide portions 34 and flows through the fifth guide portions 34 in a third flow direction which is illustrated by the directional arrows 22. As illustrated by the directional arrows 14 and 22, the third flow direction corresponds to the first flow direction. Thus, by the second collection chamber 32 a further redirection of the exhaust gas from the second flow direction into the first flow direction, as indicated by the directional arrow 20, is caused.

The exhaust gas guide ducts of the respective fifth guide portions 34 are at least in portion separate from each other. By the fifth guide portions 34, a respective connection element is formed by means of which the fifth guide portions 34 are fluidically connected to a respective SCR catalytic converter 36 (SCR—Selective Catalytic Reduction). This means the exhaust gas flowing through the fifth guide portions 34 can flow into the SCR catalytic converters 36 and can flow through the same. The SCR catalytic converters 36 serve for denitriding the exhaust gas. This means the SCR catalytic converters 36 are used for at least reducing nitrogen oxides (NOx) contained in the exhaust gas.

For example, the first guide portions 24 and the fifth guide portions 34 are arranged at different levels of height, i.e., in planes that are spaced apart from each other. With reference to the mounted state of the exhaust gas aftertreatment device 10 on the motor vehicle, the fifth guide portions 34 for instance in the vertical direction of the vehicle are arranged below the first guide portions 24, i.e., they have a lower level than these. The exhaust gas in this setup is guided by means of the first collection chamber 30 in the vertical direction of the vehicle downwards to the second guide portion 28 which is arranged below the first guide portions 24.

For denitriding the exhaust gas the exhaust gas aftertreatment device 10 includes a dosage device 38 from which a urea doser mounting 39 can be seen in FIG. 2. The dosage device 38 serves for introducing a reduction agent for the aftertreatment of the exhaust gas, i.e., for denitriding the exhaust gas, at a feed point 40 into the first collection chamber 30 and, thus, the exhaust gas aftertreatment box 12 (exhaust pipe). For this purpose, the dosage device 38 opens into the exhaust duct 31 via the urea doser mounting 39 at the feed point 40. Thus, there is a mixing zone in the region of the feed point 40 in which mixing zone the reduction agent introduced into the exhaust duct 31 is mixed with the exhaust gas flowing through the exhaust duct 31.

The reduction agent is present in the form of an aqueous urea solution containing urea and, thus, ammoniac. For denitriding the exhaust gas the ammoniac (NH3) contained in the aqueous urea solution is used, the ammoniac reacting in the respective SCR catalytic converter 36 with the nitrogen oxides in the exhaust gas to produce water and nitrogen. This reaction is caused by the SCR catalytic converters 36.

For example, the aqueous urea solution is stored in a tank which is not shown in the Figures. Moreover, the tank of the utility vehicle is fluidically connected with the dosage device 38. As can be seen from FIG. 2, the urea doser mounting 39 has a through opening 43 through which the reduction agent can flow into the exhaust duct 31. The urea doser mounting 39 serves for mounting a doser unit by means of which the reduction agent can be dosed into the exhaust duct 31 in a need-based manner.

In order to denitrate the exhaust gas particularly efficiently with a very small amount of reduction agent, a very good intermixing of the exhaust gas with the reduction agent is advantageous. For realizing this very good intermixing the exhaust gas aftertreatment device 10 includes an interference element 42 which is preferably arranged upstream of the feed point 40 in the first collection chamber 30 relative to the flow direction of the exhaust gas through the exhaust duct 31. The interference element 42 introduces extra turbulence for intermixing enhancement. It also changes the flow field downstream to produce early intermixing. Moreover, the intermixing in the second guide portion 28 is improved due to the changed flow field as well. Therefore, an at least substantially homogenous mixture of exhaust gas and reduction agent can be produced when the mixture reaches the SCR catalytic converters 36.

Figure 4:
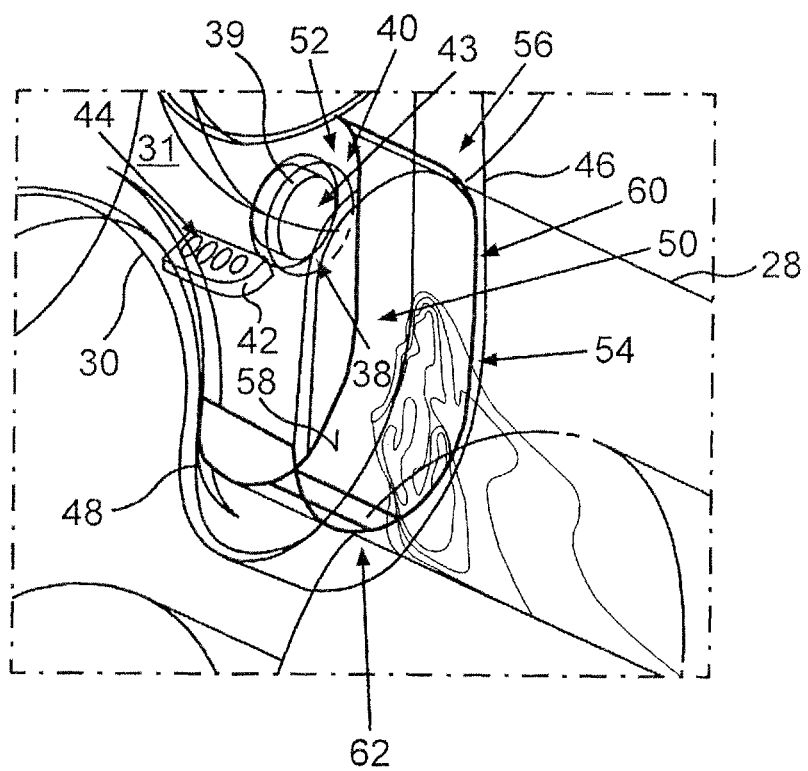
FIG. 4 is part of a schematic perspective view of the exhaust gas aftertreatment device.

As can be seen from FIG. 4, the interference element 42 can be designed as a plate which is arranged in the first collection chamber 30, in particular the exhaust duct 31 in such a way that the interference element 42 extends at least substantially perpendicularly to the flow direction of the exhaust gas. The interference element 42 has a plurality of through openings 44 through which the exhaust gas can flow. Thereby, turbulences of the exhaust gas can be caused so that a particularly good intermixing of the exhaust gas with the reduction agent can be realized.

The interference element 42 can have a flange which is used for screwing the interference element 42 on the first collection chamber 30. Thereby, a particular simple and time- and cost-efficient mounting of the interference element 42 can be realized. For example, the interference element 42 is made of a metallic material. Alternatively, the interference element 42 can be welded to the first collection chamber 30.

The interference element 42 is configured as a perforated baffle, deflector or impact baffle which leads to a particularly good intermixing. Thus, undesired local accumulations of the reduction agent within the exhaust gas can be avoided. By means of the interference element 42 and its arrangement it is also possible to realize a mixing zone in which an intermixing of the exhaust gas with the reduction agent occurs, already upstream and at the beginning of the second guide portion 28, where a particularly advantageous mixing occurs by means of the second guide portion 28. As a consequence, the second guide portion 28 is also referred to as a mixing tube. This results in a particularly good intermixing prior to the exhaust gas with the reduction agent finally flowing into the SCR catalytic converters 36.

Figure 3:
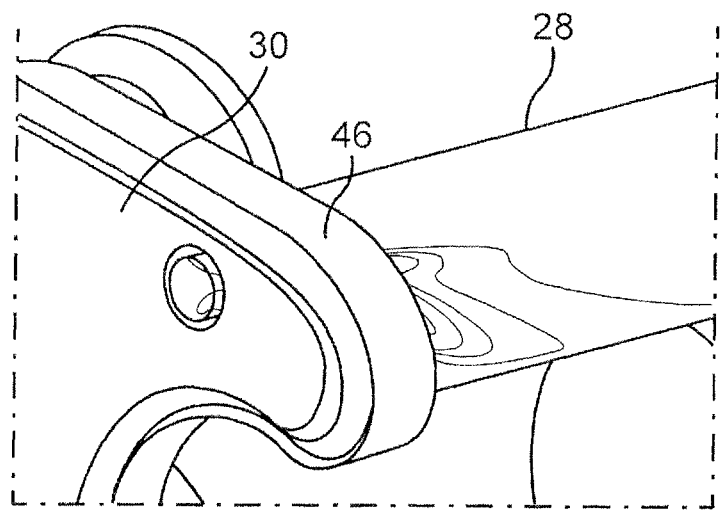
FIG. 3 is part of a schematic perspective view of the exhaust gas aftertreatment device.

As can be seen from FIG. 2, the exhaust duct 31 is bounded at least partially by a wall 46 of the first collection chamber 30. An outer surface of the wall 46 can be seen in FIG. 3. In order to avoid reduction agent deposit on the first collection chamber 30 or to keep such reduction agent deposit particularly low, the exhaust gas aftertreatment device 10 includes a baffle 48 which is arranged in the exhaust duct 31. As can be seen from FIGS. 2, 4 and 5, the baffle 48 is J-shaped and configured as an entirely closed dividing wall. This means the baffle 48 has no through opening through which the exhaust gas can flow at all. By means of the baffle 48, the exhaust duct 31 is divided into a first passage 50 having a first inlet opening 52 and a lower second passage 54 having a second inlet opening 56. The exhaust gas entering the exhaust duct 31 can flow via the respective inlet openings 52 and 56 into and through the passages 50 and 54 so that a main flow of the exhaust gas is divided into a first partial flow flowing through the first passage 50 and a second partial flow flowing through the second passage 54 by means of the baffle 48. As can be seen in FIG. 2, the passages 50 and 54 are fluidically arranged in parallel. This means the partial flows can flow through the passages 50 and 54 in a fluidically parallel manner. In other words, the exhaust gas can flow through the passages 50 and 54 simultaneously or in a parallel manner so that the exhaust gas does not need to flow through one of the passages 50 and 54 at first and then through the other one of the passages 50 and 54.

The feed point 40 is arranged in the first passage 50. This means the dosage device 38 opens into the first passage 50. Moreover, the feed point 40 is shielded from the second passage 54 by means of the baffle 48 so that the second partial flow can be kept free of reduction agent and, thus, the second passage 54 can be kept free of deposit. With respect to the vertical direction of the motor vehicle, the first passage 50 is arranged above the second passage 54. Since the reduction agent (urea or urea spray) is introduced into the first passage 50 and mixed with the exhaust gas in the first passage 50, the first passage 50 is used as an upper mixing passage. Urea droplets, this means reduction agent droplets, can hit an inner surface 58 of the baffle 48. Since the second partial flow flowing through the second passage 54 can be kept fee of reduction agent, the second passage 54 is used as a lower heating passage. Thus, the baffle 48 will be heated from the bottom by the exhaust gas or the second partial flow through the second passage 54. Since at least the second inlet opening 56 is arranged above or upstream the feed point 40 and, thus, the mixing zone, therefore, the second partial flow in the second passage 54 is urea free, i.e., reduction agent free, so that reduction agent deposit in the second passage 54 can be avoided. This ensures that the exhaust gas flowing through the clogging-free second passage 54 is always able to provide effective heating to the baffle 48 from the bottom. Thereby, the baffle 48 can be heated effectively so that low temperature zones of the baffle 48 can be reduced or eliminated thereby reducing or eliminating urea deposit on the baffle 48. It has been shown that reduction agent deposit (urea deposit) occurs in low temperature zones, and since such low temperature zones of the baffle 48 can be avoided, significant urea deposit on the baffle 48 can be avoided, too.

The second partial flow leaving the second passage 54 mixes with the already partially mixed first partial flow leaving the first passage 50 downstream of the baffle 48. The intermixed first partial flow and second partial flow form a further main flow of the exhaust gas, the main flow containing the reduction agent. This further main flow then flows through the hydraulic pipe in the form of the second guide portion 28 and through the SCR catalytic converters 36. As can be seen from FIG. 2, the baffle 48 is a splitting baffle which splits the main flow into the two partial flows and the exhaust duct 31 into the two passages 50 and 54. In order to keep the backpressure caused by the exhaust gas aftertreatment device 10 particularly low, the baffle 48 is preferably streamlined so that the baffle 48 is configured as a streamline splitting baffle (SSB).

As can be seen from FIGS. 2 and 4, the baffle 48 has an at least substantially straight portion 60 and a curved portion 62 abutting the straight portion 60, the curved portion 62 being arranged downstream of the straight portion 60 with respect to the flow direction of the exhaust gas through the exhaust duct 31. Thus, the exhaust gas is guided by the straight portion 60 towards the curved portion 62 and diverted or deflected by the curved portion 62 particularly efficiently. For example, the main body of the baffle 48 can essentially be a parallel extrusion of part of the guide portion 28, and the extrusion intersects with an end wall of the collection chamber 30 to form the second passage 54. Therefore, space between the baffle 48 and the collection chamber 30 is not necessarily strictly constant, the space depending on the shape of the collection chamber 30, in particular the wall 46, in the relative position to the guide portion 28. Also, an end plate of the collection chamber 30 is not necessarily flat at the edges, so that the line of intersection is not of regular shape.

In a further embodiment not shown in the Figures, the baffle 48 can be elongated into the guide portion 28. This means, the two-passage design of the exhaust duct 31 could be extended into the guide portion 28 so that a part or the whole guide portion 28 could be heated as well. Thereby, possible urea deposit in the guide portion can be eliminated or can be kept particularly low.

The shape of the baffle 48 as well as additional features on the baffle such as holes or fins could be further tailored to facilitate a particularly advantageous urea mixing within the exhaust duct 31 and, for example, the guide portion 28. Since the second partial flow can be kept free of reduction agent, low temperature zones and, thus, urea deposit on the wall 46 can be avoided as well.

Figure 5:
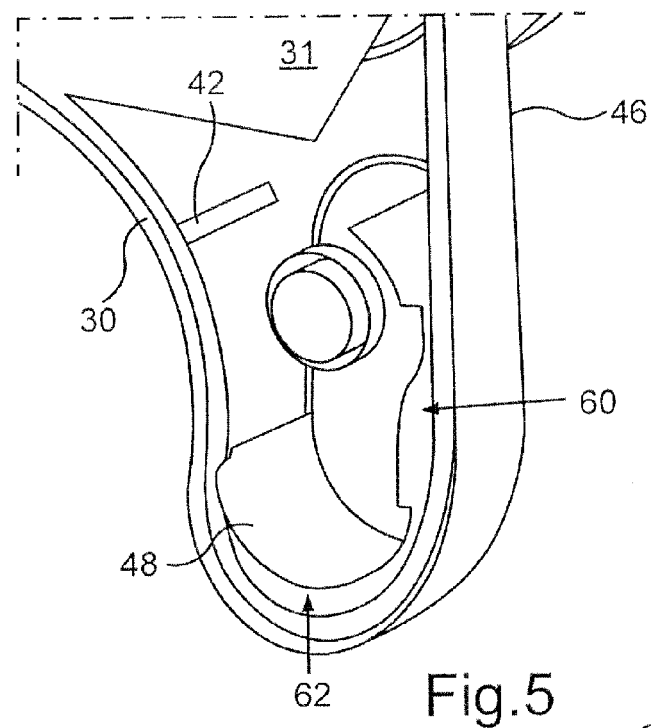
FIG. 5 is part of a schematic and perspective sectional view of the exhaust gas aftertreatment device.
Figure 6:
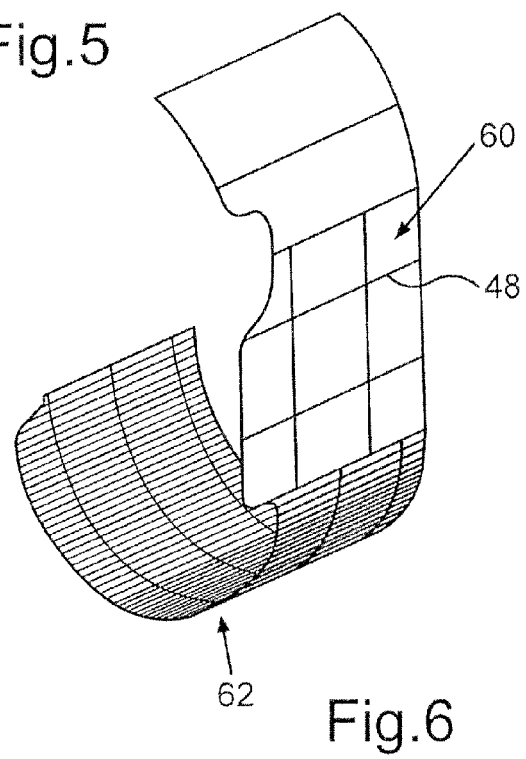
FIG. 6 is a schematic perspective view of the baffle according to a first embodiment.
Figure 7:
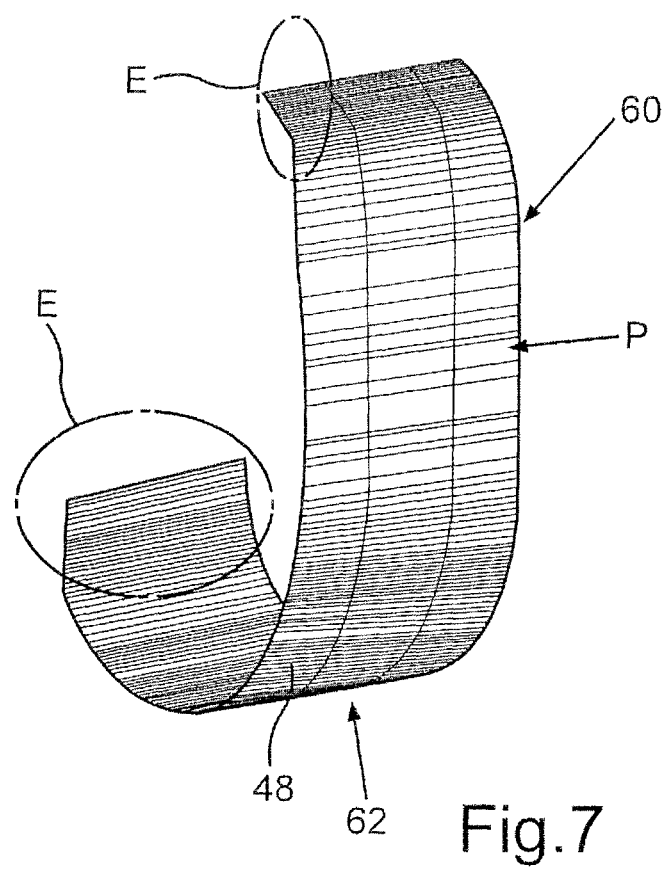
FIG. 7 is a schematic perspective view of the baffle according to a second embodiment.

FIGS. 5 and 6 show a first embodiment of the baffle 48. FIG. 7 shows a second embodiment of the baffle 48. As can be seen from FIG. 7, respective end portions E can be bent towards the first passage 50 with respect to the other portion P of the baffle 48, other portion P abutting the end portions E. Thus, a distance between the respective end portions E and the wall 46 is greater than a distance between the wall 46 and the other portion P. Alternatively, the distance between the wall 46 and the baffle 48 can be at least substantially constant across the extension of the baffle 48. Alternatively, the distance between the baffle 48 and the wall 46 can vary across the extension of the baffle 48. Thus, the flow of the exhaust gas can be influenced in a need-based and particularly efficient manner.

LIST OF REFERENCE CHARACTERS 10 exhaust gas aftertreatment device
12 exhaust gas aftertreatment box
14 directional arrow
16 directional arrow
18 directional arrow
20 directional arrow
22 directional arrow
24 first guide portion
26 exhaust gas guide ducts
28 second guide portion
30 first collection chamber
31 exhaust duct
32 second collection chamber
34 fifth guide portion
36 SCR catalytic converter
38 dosage unit
39 urea doser mounting
40 feed point
43 through opening
42 interference element
44 through openings
46 wall
48 baffle
50 first passage
52 first inlet opening
54 second passage
56 second inlet opening
58 inner surface 60 straight portion
62 curved portion
E end portion
P further portion The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust gas aftertreatment device for a combustion engine, comprising:
    an exhaust pipe element having an exhaust duct through which exhaust gas of the combustion engine is flowable;
    a feed point, wherein a reduction agent is introduced into the exhaust pipe element at the feed point; and
    a baffle arranged in the exhaust duct which divides the exhaust duct into a first passage and a second passage, wherein the first and second passages have a respective inlet opening and are fluidically arranged in parallel, and wherein a first main flow of the exhaust gas is divided into a first partial flow that flows through the first passage and a second partial flow that flows through the second passage;
    wherein the feed point is disposed in the first passage and introduces the reduction agent into the first partial flow and is shielded from the second passage by the baffle, wherein the baffle has no through opening through which the exhaust gas can flow such that the second partial flow is kept free of the reduction agent, and wherein the second partial flow that is kept free of the reduction agent leaves the second passage and mixes with the first partial flow introduced with the reduction agent leaving the first passage downstream of the baffle to form a second main flow of the exhaust gas;
    wherein the inlet opening of the second passage is disposed upstream of the feed point with respect to a direction of flow of the exhaust gas;
    wherein the baffle has a J-shape with a curved portion for diverting the exhaust gas and a straight portion extending parallel to the direction of flow of the exhaust gas and wherein the straight portion is disposed upstream of the curved portion with respect to the direction of flow of the exhaust gas.

2. The exhaust gas aftertreatment device according to claim 1, wherein the baffle has an end portion bent towards the first passage.

3. A motor vehicle, comprising:
    a combustion engine; and
    an exhaust gas aftertreatment device according to claim 1 coupled to the combustion engine.

* * * * *